April 17, 1951     A. T. MANACHER     2,549,106
COMBINATION HEATER AND DRIER
Filed Feb. 8, 1950     2 Sheets-Sheet 1
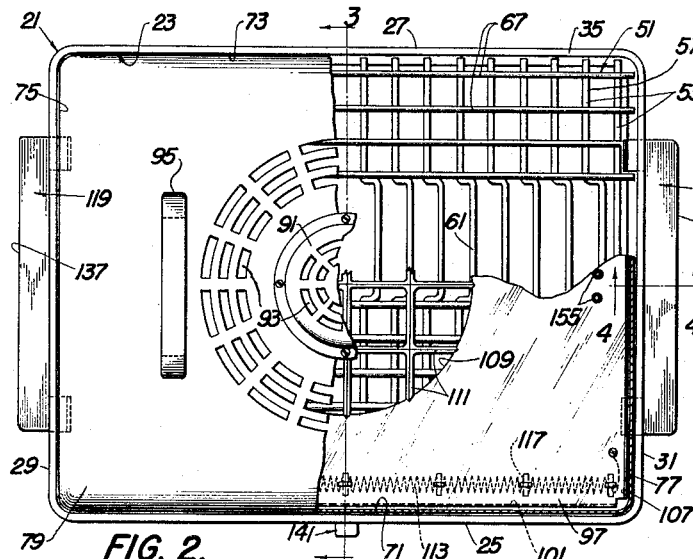
FIG. 2.
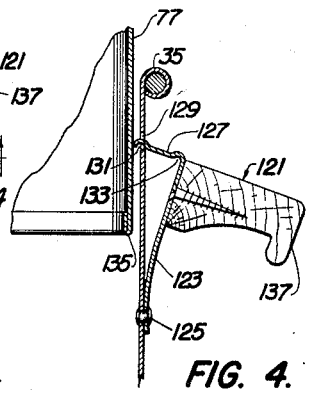
FIG. 4.
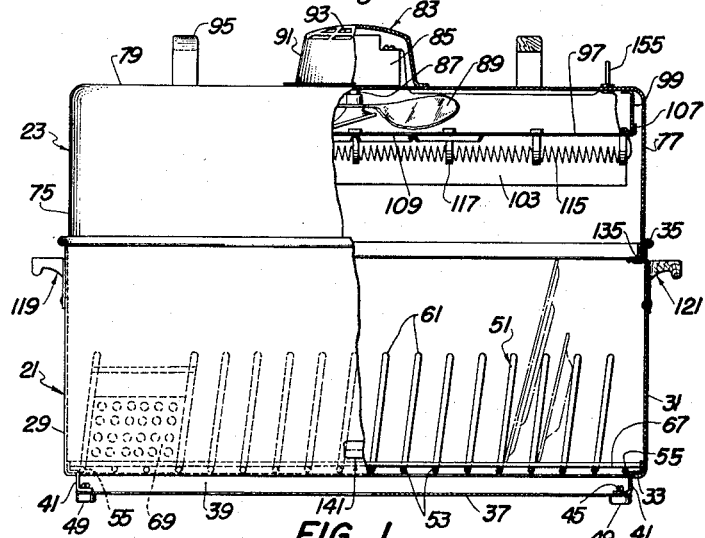
FIG. 1.
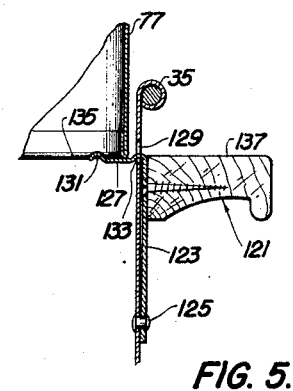
FIG. 5.
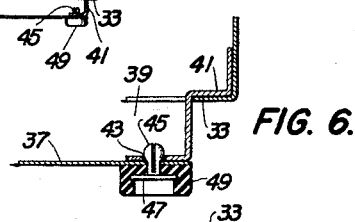
FIG. 6.
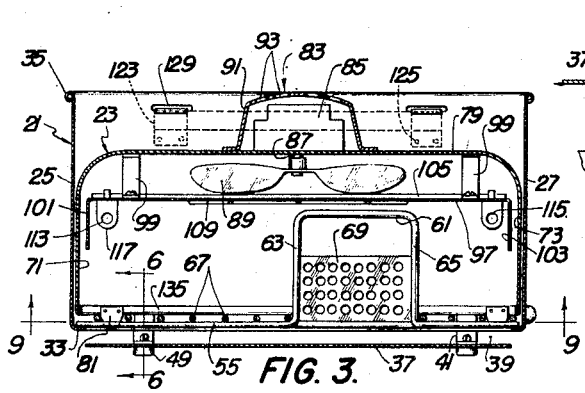
FIG. 3.
FIG. 7.
INVENTOR
ALFRED T. MANACHER
BY
ATTORNEY

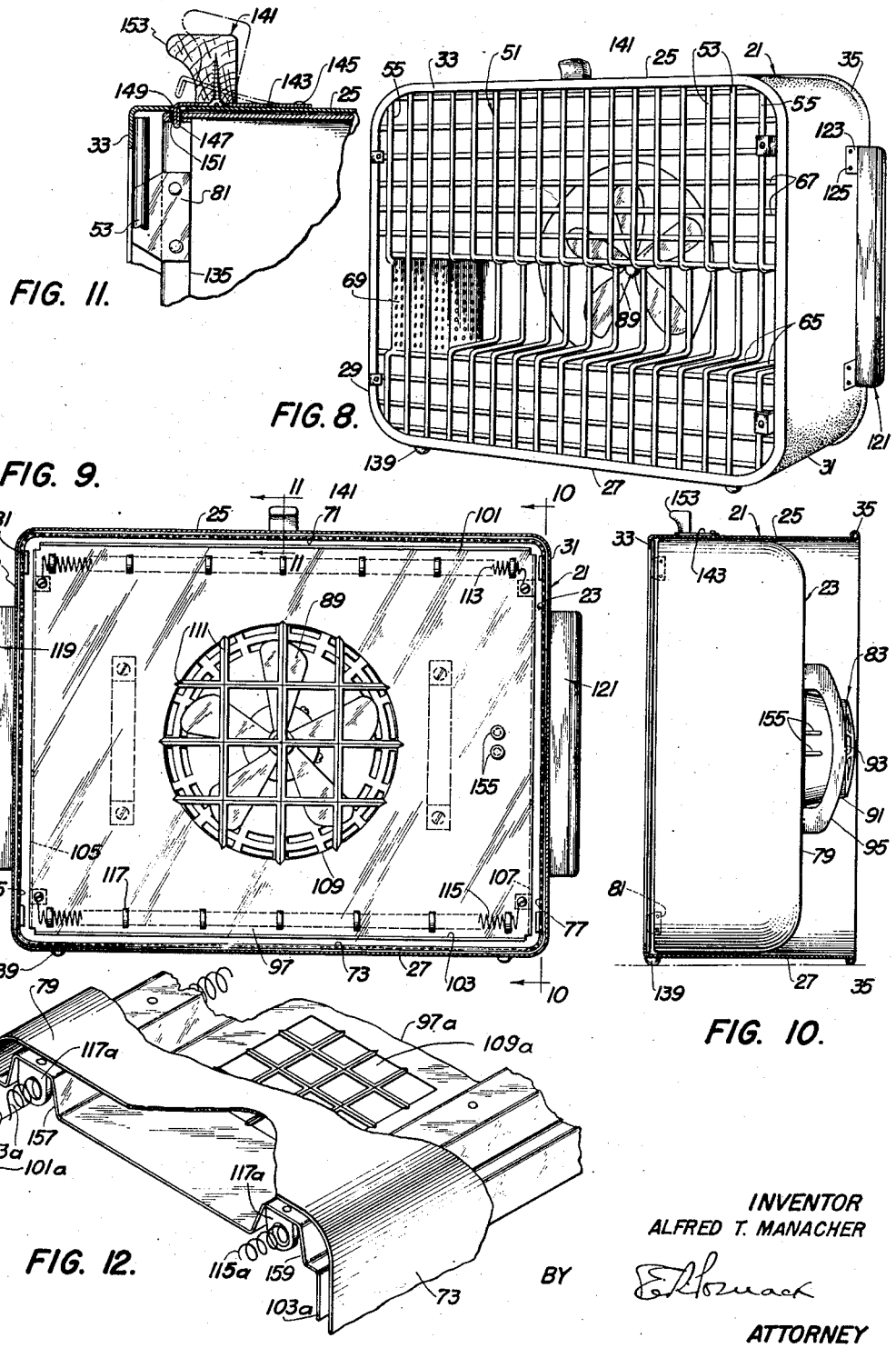

Patented Apr. 17, 1951

2,549,106

UNITED STATES PATENT OFFICE 2,549,106

COMBINATION HEATER AND DRIER

Alfred T. Manacher, New York, N. Y.

Application February 8, 1950, Serial No. 143,045

8 Claims. (Cl. 34—90)

This invention relates to combination heating and drying devices—more particularly to a unit adapted for use as a dish drier and a space heater.

It is primarily within the contemplation of my invention to provide a single device capable of several uses, including the effective drying and sterilization of dishes and silverware, the preheating thereof, as well as certain other uses to be hereinafter referred to. And in this aspect of my invention it is an important object to improve upon conventional appliances for dish drying purposes, by providing a relatively simple, and portable device which will be more effective and rapid in action than the conventional evaporating rack, and less costly and of considerably smaller bulk than the conventional mechanical dish driers.

It is also an object to provide my invention with means capable of serving as a permanent storing rack for dishes, and which can be readily and conveniently employed for heating dishes that may be required for hot plate service.

It is still a further object of my invention to provide a device of the class above-mentioned which can readily be collapsed, by a simple manipulation, and in such collapsed position either be stored, or used as a space heater. And in the last-mentioned aspect of my invention it is a further important object to employ a dish supporting rack as protective means, in the form of a grating, to prevent personal contact with the heating elements or fan.

And it is also within my contemplation to further employ said dish rack, when the device is used as a heater, for simultaneously drying small articles, such as a dish rag, a comb, a brush or other small objects. And in the accomplishment of this objective, it is a further object to employ a special form of dish rack providing a shelf for the accommodation of said articles to be dried.

It is also an object of this invention to enable it to be employed for personal drying purposes, such as the drying of the hair or hands.

Still a further object of my invention is to provide an air circulating system which will effectively direct heated air to the articles to be dried, without directly traversing the electric heating elements, thereby avoiding a common defect in electric heating units where such direct air current action on the heating elements causes an undesirable localized cooling thereof. And in this aspect of my invention it is a further object to provide optimum heat distribution throughout the interior thereof, by permitting the heating elements to remain protected against cooling drafts and thereby of equal temperatures throughout their extent.

It is also within my contemplation to provide a device of the class described having a cover movable between an upper and a lower position, in which retractable cover-supporting means are provided to hold the cover in its upper position, said cover-supporting means also serving as handles for moving or carrying the whole unit.

Other objects, features and advantages will appear from the drawings and the description hereinafter given.

Referring to the drawings,

Figure 1 is a side elevation, partly in cross-section, of a preferred embodiment of my invention.

Figure 2 is a plan view thereof, fragments being broken away for clarity.

Figure 3 is a cross-sectional view taken along the line 3—3 of Figure 2, but with the cover in its lower position.

Figure 4 is a fragmentary cross-sectional view of a cover support and related parts taken along the line 4—4 of Figure 2 but showing the support in its retracted position.

Figure 5 is a view similar to Figure 4 but showing the support in its cover-supporting position.

Figure 6 is a fragmentary cross-sectional view of the floor attaching means taken along the line 6—6 of Figure 3.

Figure 7 is a bottom view of Figure 6.

Figure 8 is a perspective view of the unit in its side position and with the floor removed.

Figure 9 is a cross-sectional view taken along the line 9—9 of Figure 3 and with the dish rack and wiring being removed for clarity.

Figure 10 is a cross-sectional view taken along the line 10—10 of Figure 9.

Figure 11 is a fragmentary cross-sectional view of the cover locking means, taken along the line 11—11 of Figure 9.

Figure 12 is a fragmentary perspective view of the cover and related parts showing a modification of my invention.

The heating and drying unit of my invention comprises a substantially rectangular casing generally designated at 21 which acts as a base for the unit and also houses the dish-receiving elements, and a cover 23 which is supportable in an upper position above the cover, as shown in Figure 1, or in a lower position telescopically nested within the cover as shown in Figure 3, and which mounts the heater and fan elements to be later described. The casing has two lateral side walls 25 and 27 and two lateral end walls 29 and 31; the lower edges of these lateral walls being turned inwardly to form a flange 33 which extends peripherally around the bottom of the casing. The upper edges of the walls may be beaded as shown at 35 for purposes of appearance and convenience in handling. A floor is separably attached to the bottom of the casing, the floor being in the form of a rectangular plate 37 peripherally spaced from the flange 33 to leave a space 39 therebetween. The means for separably attaching floor plate 37 to the casing may comprise a plurality of brackets 41 fixed to the bottom of the casing and extending downwardly therefrom, as shown in detail in Figure 6. The lowermost portion of each of these brackets comprises an apertured section 43 which is adapted to receive a corresponding snap button 45 fixed to plate 37. The lower flanged section 47 of each of the snap buttons may also serve to hold a foot member 49 in place below plate 37.

A dish rack 51 for holding dishes and other eating utensils is disposed within the casing in the lower portion thereof. The rack comprises a plurality of parallel wires 53 having end sections 55 and 57 parallel to the bottom of the casing and with their terminals resting on flange 33. The intermediate section 61 of each of the wires is substantially in an inverted U-shape when the unit is resting as shown in Figure 3, the sides 63 and 65 of the inverted U being parallel to the sides 25 and 27 respectively of the casing and inclined slightly with respect to walls 29 and 31. Wires 67 extend across and at right angles to end sections 55 and 57 of wires 53 and serve to connect the latter so as to form a rigid structure adapted to support dishes in a manner such as is shown in Figure 1. A basket 69 is positioned at one end of the rack and is designed to hold silverware in proper position for drainage, drying or storing purposes.

The cover 23 comprises two lateral side walls 71 and 73, two lateral end walls 75 and 77, and a roof 79 connecting the lateral walls along the top edges thereof. The lateral walls are so proportioned as to fit telescopically within casing 21 when the cover is moved to its lower position shown in Figure 3, feet 81 attached to the lower marginal edge of the cover resting on flange 33 between wires 67 of the rack when the cover is in said lower position. Centrally mounted in roof 79 is a fan 83 comprising a fan motor 85 mounted above the roof and having a shaft 87 projecting therethrough, and fan blades 89 disposed below the roof and mounted so as to blow air downwardly when the motor is operating. A ventilated fan motor housing 91 is mounted over the fan motor, and openings 93 in the roof immediately above the fan blades are arranged in a circular fashion so as to allow an adequate supply of air to flow downwardly through the roof when the fan is running. Handles 95 are mounted on the roof outwardly of said openings and are so arranged as to permit easy handling of the cover when moving it into or out of the casing.

A plate 97 is suspended from roof 79 by means of brackets 99, and is designed to act both as a support for the heating elements and as a guard for the fan. Plate 97 is substantially rectangular in shape and has two downwardly directed side flanges 101 and 103, and two upwardly directed end flanges 105 and 107 on the marginal edges thereof. The central portion of plate 97 is apertured to provide an air passageway 109 from the fan, and a grillwork 111 integral with the plate is positioned over the passageway as a protective guard. Two heating elements 113 and 115 are suspended from plate 97 by a plurality of spaced insulative brackets 117 and are disposed along the side marginal portions of the plate inwardly from flanges 101 and 103 and in lateral flanking relation with air passageway 109. These heating elements may be of the conventional resistance-wire type and preferably are of such capacity as to provide sufficient heat to substantially raise the temperature of air circulating within the unit when the fan is in operation.

The cover is maintained in its upper position by a pair of oppositely disposed supports 119 and 121 mounted on walls 29 and 31 respectively, the structures of which are shown in detail in Figures 3, 4 and 5. Each support comprises a pair of spring plates 123 fixed at their lower terminals to the outside of the casing by means of rivets 125 and each having a cover-supporting or rest arm 127 at its upper end and extending through a slot 129 in the casing. The undersurface of the rest arm has at its inner terminal a slight depression 131 and at its outer terminal another depression 133, and the proportions are such that the rest arm is pressed by the spring tension against the lower edge of the slot so that either depression 131 or 133 will snap into place on the edge, thus keeping the arm either in a retracted position out of the path of the cover, as shown in Figure 4, or in a supporting position as shown in Figure 5, in which the lower seamed edge 135 of the cover will be supported by the rest arm. A handle 137 of insulative material connects the upper portions of each pair of spring plates and extends outwardly from the casing. Handles 137 may therefore serve both as moving means for the supports and as handles for carrying the unit.

The unit is adapted for use either in the upright position shown in Figure 1 or in the side position shown in Figure 8. For the latter purpose side wall 27 has attached thereto a pair of supports 139 at the lower end thereof, whereby the unit will rest firmly in its side position upon supports 139 and on beaded edge 35, as shown in Figure 10. To hold the cover 23 in its nested position when the unit is on its side, a lock 141 is provided on side wall 25, which becomes the upper wall when the unit is resting on wall 27. As shown in detail in Figure 11, lock 141 comprises a spring member 143 attached at one end to the outside of wall 25 by such means as a rivet 145. The spring member has a latch portion 147 at its opposite end, the latch portion normally being urged by the spring to extend through a slot 149 in wall 25, as shown by the solid lines in Figure 9. When the cover 23 is in its lower position, a slot 151 in the seamed edge 135 is in alignment with slot 149. A handle 153 is mounted on spring member 143 to allow the latch to be retracted to the dot-dash position of Figure 11 so that the cover may be moved into or out of its lower position. It will be observed that when the latch has entered slot 151 it will prevent the cover from being manually moved from its lower position and will also prevent the natural tendency of the cover to tilt backwards due to the weight of the fan motor.

In use, the drying and heating unit of my invention is operable either in its upright position shown in Figures 1 and 3 or in its side position shown in Figures 8, 9 and 10. When in the upright position the unit may be used for drying, preheating or storing dishes and silverware, and in this use of the device the cover is first removed and the desired dishes and other utensils placed in rack 51. Cover supports 119 and 121 are then moved to their supporting position and cover 23 is placed thereon. It will be observed by referring to Figure 1 that when in this position ample clearance is afforded above rack 51 to accommodate dishes and other utensils, and that any drippings will be allowed to flow downwardly onto plate 37 and out of the unit through space 39. If it is desired to preheat or dry the dishes the electrical terminals 155, which are wired in a conventional manner to the fan and the heater elements, are then connected to a source of electrical power. The air currents from the fan will then circulate in the upper part of the cover, being heated by elements 113 and 115, and the heated air will pass downwardly through the dish rack and its contents, and will flow out of the unit through the peripheral space 39 between plate 37 and the casing. It will be noted that due to the relatively large air space above the dish rack, ample circulation will be allowed to permit the air currents to reach an effective drying or heating temperature. It will also be observed that due to the lateral spacing of heating elements 113 and 115 relative to the air passageway 109, the heating elements will not be subject to rapid localized cooling due to direct air currents.

When it is desired to preheat, dry, or store small utensils or when the unit is to be stored, supports 119 and 121 are retracted and cover 23 moved downwardly to its lower or nested position, latch 147 being retracted momentarily to allow the cover to be locked. It will be observed that when in this position plate 97 clears the highest portion of rack 51, and that the fan housing 91 is retracted entirely within the confines of casing 21, allowing the unit to be easily stored. Handles 137 may conveniently be used to move the unit, and if rest arms 127 are moved to their inwardly extending position they will act as additional retaining means to prevent cover 23 from being withdrawn from the casing.

In order to use the device as a space heater, for personal drying purposes or for drying small objects, the cover 23 is first locked in its lower or nested position within the casing and the latter is then placed on its side wall 27, as shown in Figures 8 and 9, so as to rest on supports 139 and beaded edge 35 as heretofore described. The fan and heating elements are then energized, and warm air will flow through the rack and toward the floor plate 37. If the unit is being used as a space heater, floor plate 37 may be left attached to the unit, thereby acting as a baffle plate to radially spread the heated air which emanates from peripheral space 39 evenly in all directions. If it is desired to have a direct flow of air into the room, or if the unit is to be used for personal drying purposes, the floor plate may be removed by pulling snap buttons 45 out of apertured brackets 41, in which case the heated air will flow horizontally from the casing. It will be observed by referring to Figure 8 that when the floor plate is removed, rack 51 will act as a grating to prevent harmful contact with the fan or the heating elements. It will also be noted that the portions 55 of wire element 53 will be substantially horizontal and will together form a recessed shelf adapted to support, for drying purposes, small articles such as brushes and combs. The lock 141 will prevent the natural tendency of the cover to tilt backward out of position due to the weight of fan motor 85, and the stable position of the cover together with its supporting legs 81 abutting flange 33 between wire elements 67 will keep the rack 51 in a firm position against flange 33.

Figure 12 shows a modified heater-supporting plate 97a having two parallel recessed portions 157 and 159 within which heating elements 113a and 115a are suspended by means of insulative brackets 117a. The recessed portions are spaced from side flanges 101a and 103a and from air passageway 109a, which may be of rectangular design, and are so proportioned as to allow air to circulate evenly around the heating elements while at the same time keeping the latter entirely protected from direct drafts due to the air current from the fan. It will thus be seen that the possibility of localized cooling of the heating elements will be substantially prevented, and that a larger air space will be provided in which the air drawn into the unit may be effectively and uniformly heated.

I have thus provided a combination heating and drying device of the class described which is capable of varied uses, and which is simple, portable, and less costly than conventional devices of this nature. The device may be effectively used as a rack for storing dishes and silverware, or as a drier or preheater thereof. It may also be utilized as a space heater or for personal drying, the dish rack in these instances acting as a protective grating, or may be used to dry small articles, in which case a portion of the rack also acts as a shelf to support such articles. When used as a dish drier the device will also afford an effective circulation of the heated air with optimum heat distribution throughout the interior, and will avoid localized cooling drafts on the heating elements to keep the latter at equal temperatures throughout their extent.

In the above description, the invention has been disclosed merely by way of example and in preferred manner; but obviously many variations and modifications may be made therein. It is to be understood, therefore, that the invention is not limited to any specific form or manner of practicing same, except in so far as such limitations are specified in the appended claims.

I claim:

1. In a heating and drying unit of the class described, a casing, a cover therefor operatively supportable relative thereto in an upper and a lower position, the cover in the upper position being disposed at the top of the casing and in the lower position within the casing, retractable cover-supporting means on the casing adapted to support the cover in said upper position, a dish rack within the casing, said cover having a roof disposed above the rack when the cover is in its said lower position, and electrical heating means operatively disposed below said roof, said casing having a floor peripherally spaced from the lateral sides thereof, whereby an outlet aperture is provided for dish drippings and for heated air currents when the device is positioned on a side for use as a space heater.

2. In a heating and drying unit of the class described, a casing, a cover therefor operatively supportable relative thereto in an upper and a lower position, retractable cover-supporting means on the casing adapted to support the cover in said upper position, a dish rack within the casing, said cover having a roof disposed above the rack when the cover is in its said lower position, electrical heating means operatively disposed below said roof, and a fan attached to said cover and movable therewith, whereby said fan will be in closer position to said rack when said cover is in its said lower position, supports on the lateral walls of said casing operatively supporting the rack, the casing having a floor removably attached thereto, whereby there will be a direct flow of air from said fan means out of said casing through said rack.

3. In a heating and drying unit of the class described, a casing, a cover therefor operatively supportable relative thereto in an upper and a lower position, retractable cover-supporting means on the casing adapted to support the cover in said upper position, a dish rack within the casing, said cover having a roof disposed above the rack when the cover is in its said lower position, electrical heating means operatively disposed below said roof, and a fan attached to said cover and movable therewith, whereby said fan will be in closer position to said rack when said cover is in its said lower position, supports on the lateral walls of said casing operatively supporting the rack, the casing having a floor removably attached thereto, whereby there will be a direct flow of air from said fan means out of said casing through said rack, one lateral side of said casing being substantially flat, whereby the unit can be set up thereon for us as a space heater.

4. In a heating and drying unit of the class described, a casing, a cover therefor operatively supportable relative thereto in an upper and a lower position, the cover in the upper position being disposed at the top of the casing and in the lower position within the casing, retractable cover-supporting means on the casing adapted to support the cover in said upper position, a dish rack within the casing, said cover having a roof disposed above the rack when the cover is in its said lower position, and electrical heating means operatively disposed below said roof, one lateral side of said casing being substantially flat, whereby the unit can be set up theron for use as a space heater, and a retractable lock on said casing releasably engageable with said cover, said lock comprising a latch mounted on a lateral wall of said casing and spring means urging said latch into locking engagement with said cover when the latter is in its said lower position, whereby said cover will be held against dislodgement when the unit is operatively positioned on said flat side.

5. In a heating and drying unit of the class described, a casing, a cover therefor operatively supportable relative thereto in an upper and a lower position, a dish rack within the casing, said cover having a roof disposed above the rack when the cover is in its said lower position, electrical heating means operatively disposed below said roof, and retractable cover-supporting means on the casing adapted to support the cover in said upper position, said last-mentioned means comprising a handle member mounted on a lateral wall of said casing and extending outwardly therefrom, whereby said member may serve as a handle for said unit, and cover-supporting means integral with said handle member and extendible through said lateral wall, said supporting means being movable by said handle member between a retracted position exteriorly of said casing and a cover-supporting position within said casing and in supporting relation with said cover when the latter is in its upper position.

6. In a heating and drying unit of the class described, a casing, a cover therefor operatively supportable relative thereto in an upper and a lower position, retractable cover-supporting means on the casing adapted to support the cover in said upper position, a dish rack within the casing, said cover having a roof disposed above the rack when the cover is in its said lower position, electrical heating means operatively disposed below said roof, and a fan attached to said cover and movable therewith, whereby said fan will be in closer position to said rack when said cover is in its said lower position, the casing having a floor removably attached thereto, whereby there will be a direct flow of air from said fan means out of said casing through said rack, the rack having an upwardly recessed portion, whereby when the unit is operatively supported on a lateral side of said casing said recessed portion will serve as a receptacle adapted to hold an article for drying.

7. In a heating and drying unit of the class described, a casing, a cover therefor operatively supportable relative thereto in an upper and a lower position, retractable cover-supporting means on the casing adapted to support the cover in said upper position, a dish rack within the casing, said cover having a roof disposed above the rack when the cover is in its said lower position, electrical heating means operatively disposed below said roof, and a fan attached to said cover and movable therewith, whereby said fan will be in closer position to said rack when said cover is in its said lower position, the casing having a floor removably attached thereto, whereby there will be a direct flow of air from said fan means out of said casing through said rack, the rack having a plurality of parallel wire elements with inwardly bent intermediate portions disposed in a substantially horizontal plane when the unit is supported on a lateral side of said casing, whereby said intermediate portions will together form a shelf adapted to hold an article for drying.

8. In a heating and drying unit of the class described, a casing, a cover therefor operatively supportable relative thereto in an upper and a lower position, retractable cover-supporting means on the casing adapted to support the cover in said upper position, a dish rack within the casing, said cover having a roof disposed above the rack when the cover is in its said lower position, electrical heating means operatively disposed below said roof, and a fan attached to said cover and movable therewith, whereby said fan will be in a closer position to said rack when said cover is in its said lower position, a floor detachably secured to the casing, whereby upon an operative removal of the floor the unit may be supported on one of its sides to serve as a space heater, the said rack being apertured, whereby it will serve both as a protective guard and an outlet for fan currents.

ALFRED T. MANACHER.

REFERENCES CITED

The following references are of record in the file of this patent:

UNITED STATES PATENTS

| Number | Name | Date |
|---|---|---|
| 1,755,539 | Gerosa | Apr. 22, 1930 |
| 2,026,991 | Martin | Jan. 7, 1936 |
| 2,385,809 | Hooper | Oct. 2, 1945 |